(12) United States Patent
Goepfert et al.

(10) Patent No.: US 12,166,851 B2
(45) Date of Patent: Dec. 10, 2024

(54) TIMING DETECTION AND CORRECTION METHOD FOR A SLAVE DEVICE IN AN IO-LINK COMMUNICATION AND SLAVE DEVICE OF AN IO-LINK COMMUNICATION

(71) Applicant: Renesas Electronics Germany GmbH., Dresden (DE)

(72) Inventors: Lars Goepfert, Dresden (DE); Thomas Reichel, Dresden (DE); Tilo Schubert, Dresden (DE); Miru Richard George, Dresden (DE)

(73) Assignee: Renesas Electronics Germany GmbH, Dresden (DE)

( * ) Notice: Subject to any disclaimer, the term of this patent is extended or adjusted under 35 U.S.C. 154(b) by 365 days.

(21) Appl. No.: 17/680,701

(22) Filed: Feb. 25, 2022

(65) Prior Publication Data
US 2022/0278819 A1 Sep. 1, 2022

(30) Foreign Application Priority Data
Feb. 26, 2021 (EP) ..................... 21159590

(51) Int. Cl.
*H04L 7/00* (2006.01)
*G06F 13/42* (2006.01)
(52) U.S. Cl.
CPC ........ *H04L 7/0012* (2013.01); *G06F 13/4213* (2013.01); *G06F 13/4273* (2013.01)
(58) Field of Classification Search
CPC . G06F 13/4213; G06F 13/4273; G06F 7/0012
See application file for complete search history.

(56) References Cited

U.S. PATENT DOCUMENTS

| | | | | |
|---|---|---|---|---|
| 9,292,036 B2 * | 3/2016 | Grocutt | ............... | G06F 13/4282 |
| 10,848,160 B2 * | 11/2020 | Sammel, Jr. | .......... | H03L 7/0992 |
| 11,038,608 B2 * | 6/2021 | Lv | .......... | H04J 3/0667 |
| 11,520,716 B2 * | 12/2022 | Sato | .................... | G06F 13/1668 |
| 2012/0030495 A1 * | 2/2012 | Chandhoke | ............... | G06F 1/14 |
| | | | | 713/400 |
| 2012/0110225 A1 * | 5/2012 | Wessling | .................. | G04G 7/00 |
| | | | | 710/61 |
| 2013/0223458 A1 * | 8/2013 | Bui | ...................... | H04J 3/0667 |
| | | | | 370/503 |
| 2014/0351359 A1 * | 11/2014 | Grocutt | ..................... | G06F 1/12 |
| | | | | 709/209 |
| 2020/0252678 A1 * | 8/2020 | Elliot | ................... | H04W 56/004 |
| 2021/0075644 A1 * | 3/2021 | Bagalá | .................. | H04L 25/028 |

\* cited by examiner

*Primary Examiner* — Henry Tsai
*Assistant Examiner* — Christopher A Daley
(74) *Attorney, Agent, or Firm* — SCULLY, SCOTT, MURPHY & PRESSER, P.C.

(57) ABSTRACT

A slave device for IO-Link communication with a master device, wherein the master device and the slave device operate on a common basic timing, the slave device including at least one Universal Asynchronous Receiver Transmitter (UART) module configured to detect an INIT request sent from the master device during communication setup, calculate an actual timing of the master device from the INIT request and correct an initial timing of the slave device to an actual timing of the slave device based on the actual timing of the master device.

15 Claims, 3 Drawing Sheets

TIMING DETECTION AND CORRECTION METHOD FOR A SLAVE DEVICE IN AN IO-LINK COMMUNICATION AND SLAVE DEVICE OF AN IO-LINK COMMUNICATION

CROSS-REFERENCE TO RELATED APPLICATION

This application claims priority to European Patent Application No. EP 21159590.5, filed on Feb. 26, 2021. The entire disclosure of European Patent Application No. EP 21159590.5 is incorporated by this reference.

BACKGROUND

The invention relates to a timing detection and correction method for a slave device in an IO-Link communication, wherein a master device and the slave device operate on a common basic timing. The invention further relates to a slave device of an IO-Link communication, wherein a master device and the slave device operate on a common basic timing.

IO-Link is a short distance industrial communications networking standard (IEC 61131-9). The communication via IO-Link is bi-directional, digital, point-to-point and wired or wireless. IO-Link is for example used for connecting digital sensors and actuators in industrial applications. An IO-Link comprises a master device and at least one slave device, i.e., sensor or actuator. The master device provides an interface to higher-lever controller (PLC) and controls, particularly initiates, the communication with the slave devices. The IO-Link communication between the master device and the at least one slave device is based on a Universal Asynchronous Receiver Transmitter (UART) communication.

UART communication is an asynchronous serial communication in which the data format and transmission speeds are configurable. A major design aspect and requirement for UART communications—being asynchronous—is the timing accuracy between the master device and the slave device. The timing is for example defined by an agreed baud rate, wherein the master device and the slave device use crystal-based timing references or oscillators. However, internal oscillators cannot provide the required timing accuracy over the full temperature range and external crystal-based timing references require additional space.

SUMMARY

It is therefore an object to enhance the timing accuracy between the master device and the slave device of an IO-Link communication.

The object is solved by a time detection and correction method for a slave device in an IO-Link communication, wherein a master device and the slave device operate on a common basic timing, comprising the steps of:
detecting an INIT request at the slave device sent from the master device during communication setup,
calculating the actual timing of the master device from the received INIT request, correcting the initial timing of the slave device to an actual timing based on the calculated timing of the master device.

In an IO-Link communication, particularly a UART communication, the master device and the slave device of the communication operate on a common basic timing. The slave device for example comprises a UART module to detect the INIT request sent from the master device during communication setup, as known in the prior art. To improve the timing accuracy the slave device, particularly the UART module, analyses the received INIT request and calculates the actual timing of the master device from the received INIT request. Since the master device and the slave device operate on a common basic timing, the slave device has knowledge about the basic timing and on that basis the slave device can calculate the actual timing from the received INIT request by detecting differences to the expected basic timing.

The initial timing of the slave device, which is based on the common basic timing, is corrected to an actual timing of the slave device based on the calculated actual timing of the master device. Since the initial timing of the slave device is corrected to the actual timing of the master device based on the received INIT request sent by the master device, the slave device can use an internal oscillator as timing reference for the common basic timing. Although such an oscillator does not provide the necessary accuracy, particularly over a high temperature range, the method improves the accuracy based on the actual timing of the master device calculated from the received INIT request. Thus, using the method, the slave device can use an oscillator timing reference and at the same time provide the necessary timing accuracy for the protocol communication.

According to a variant, the common basic timing is defined as a baud-rate and the correction of the initial timing of the slave device is based on a baud rate offset. The baud rate defines the speed of communication over a data channel in telecommunications or electronics. The unit for the baud rate is symbols per second or pulses per second. The baud rate offset defines how the initial timing, i.e., the initial baud rate, has to be corrected (amended) to correspond to the actual timing, i.e., actual baud rate, of the master device.

In a variant, the method further comprises the step of continuously tracking the actual timing of the master device and correcting the actual timing of the slave device. Thus, the timing of the slave device is not only corrected at the beginning of the communication, i.e., by correcting the initial timing of the slave device, but is continuously corrected by tracking the actual timing of the master device and correcting the actual timing of the slave device.

Pursuant to a variant, the continuously tracking of the actual timing of the master device comprises the step of calculating the actual timing of the master device from at least one received data transmission at the slave device. Thus, instead of analysing the INIT request sent by the master during communication setup the slave analyses the regular received data transmission to continuously correct the actual timing of the slave device.

According to a variant, the step of calculating the actual timing of the master device from the at least one received data transmission at the slave device is performed after each received data transmission or in regular intervals. Depending on the accuracy of the timing reference of the slave device the step of calculating the actual timing of the master device from a received data transmission at the slave device is performed after each received data transmission or in regular intervals.

In a further variant, the actual timing of the slave device is corrected after the end of one or more complete master telegrams, wherein one master telegram comprises two or more data transmissions. The first master telegram can comprise the INIT request and one or more data transmissions. In this variant, the slave device receives multiple data transmissions respectively the INIT request and one or more data transmissions from the master device in a so-called master telegram. After the complete master telegram has been received the slave device corrects the timing based on the analysis of the data transmissions respectively the analysis of the INIT request and data transmissions in the master telegram. At the same time, the slave device can prepare a response to the master telegram and send the response to the master device using the corrected actual timing of the slave device.

Pursuant to a variant, the correction of the actual timing of the slave device is based on low-pass filtering multiple data transmission of one or more master telegrams.

Again, the first master telegram includes the INIT request, which can also be considered during low-pass filtering.

According to a variant, the step of calculating the actual timing of the master device from the received INIT request and/or the received data transmission comprises the step of extracting timing information from the received INIT request and/or the received data transmission. The step of extracting timing information from the received INIT request and/or the received data transmission bases for example on an analysis of the bits in the INIT request and/or the received data transmission.

In a variant, the step of extracting the timing information from the received INIT request and/or from the received data transmission comprises the step of detecting rising and/or falling edges in the INIT request and/or the received data transmission. By calculating times between certain rising and/or falling edge of bits in the INIT request and/or the received data transmission the slave device can calculate the actual timing of the master.

Pursuant to a variant, the step of extracting timing information from the received INIT request and/or the received data transmission is performed by a hardware component of the slave device. The extraction of timing information from received INIT request and/or the received data transmission can be easily implemented by a hardware component, for example by detecting rising and/or falling edge of bits in the received INIT request and/or the received data transmission using a comparator. The hardware component further provides a high accuracy.

According to another variant, the step of calculating the actual timing of the master device from the received INIT request and/or the received data transmission is performed by a software component of the slave device, wherein the software component processes the timing information extracted from the received INIT request and/or the received data transmission. The software component used to calculate actual timing from the timing information extracted from the received INIT request and/or the received data transmission can be easily amended, optimized and/or replaced.

In a variant the initial timing and/or actual timing of the slave device is only corrected if a certain threshold is exceeded. Thus, not every slight deviation of the actual timing of the slave device with respect to the actual timing of the master device is corrected because slight deviations do not have a negative effect on the data transmission. Only if a certain threshold is exceeded, the actual timing of the slave device must be corrected to the actual timing of the master device to avoid any negative effect on the data transmission. The threshold level can be for example parametrized or adaptive, i.e., the threshold can depend on certain parameters or be adapted.

Pursuant to a variant, the step of calculating the actual timing of the master device from the received INIT request and/or calculating the actual timing of the master device from at least one received data transmission comprises the step of counting clock pulses in the INIT request, the at least one data transmission and/or in master telegrams.

According to a variant, the slave device of the IO-Link communication comprises at least one UART module implementing the methods steps of:

detecting an INIT request at the slave device sent from the master device during communication setup, calculating the actual timing of the master device from the received INIT request, correcting the initial timing of the slave device to an actual timing based on the calculated timing of the master device.

In a variant, the slave device of the IO-Link communication comprises multiple UART modules each implementing the aforementioned method steps and having different initial timing settings. Thus, the IO-Link slave device has multiple UART modules, each configured to a different initial timing. For example, the slave device comprises four UART modules with different initial timing distributed over +/−5%. Due to the different initial timing settings the chances increase that one UART module correctly receives the INIT request sent from the master device during communication setup. Afterwards this UART module is used for the IO-Link communication. If the number of UART modules is increased, it is possible to detect the INIT request in a wider timing range.

The object is further solved by a slave device of an IO-Link communication, wherein a master device and the slave device operate on a common basic timing, wherein the slave device comprises at least one UART module that implements the method described above. The slave device can comprise specific hardware and/or software to implement the methods described above. The slave device can be implemented in an integrated circuit without any external components like e.g., crystal-based timing devices. The integrated circuit can comprise a memory for storing software components of the slave device.

Pursuant to a variant, the slave device comprises multiple UART modules having different initial timing settings and each implementing the method described above. Thus, the IO-Link slave device has multiple UART modules, each configured to a different initial timing. For example, the slave device comprises four UART modules with different initial timing distributed over +/−5%. Due to the different initial timing settings the chances increase that one UART module correctly receives the INIT request sent from the master device during communication setup. Afterwards this UART module is used for the IO-Link communication. If the number of UART modules is increased, it is possible to detect the INIT request in a wider timing range.

BRIEF DESCRIPTION OF THE DRAWINGS

In the following, embodiments of the invention will be explained with reference to the attached figures.

DETAILED DESCRIPTION

Figure 1:
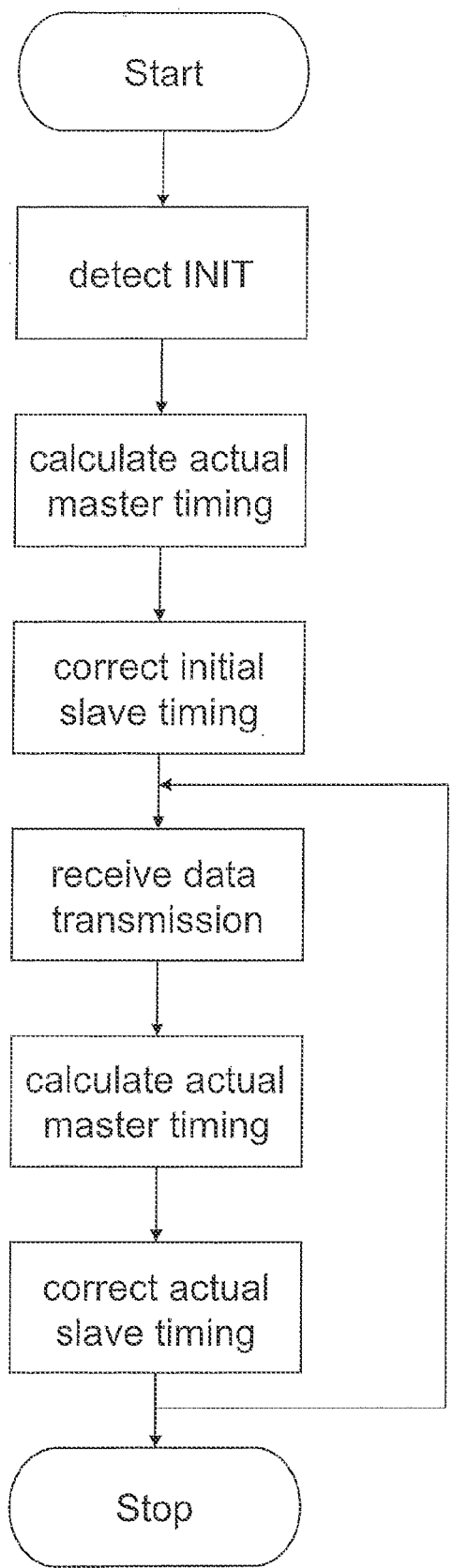
FIG. 1 a flow chart of a timing and detection method for a slave device in an IO-Link communication according to a first embodiment, FIG. 2 a flow chart of a timing and detection method for a slave device in an IO-Link communication according to a second embodiment, and FIG. 3 a signal diagram of an INIT request of an IO-Link communication and the extracting of timing information from the received INIT request.

FIG. 1 shows a flow chart of a first embodiment of a timing and detection method for a slave device in an IO-Link communication.

The IO-Link communication is asynchronous, wherein a master device and the slave device operate on a common basic timing. In an asynchronous communication there is no common timing reference for the master device and the slave device slave. The timing is for example defined by an agreed baud rate, wherein the master device and the slave device use crystal-based timing references or oscillators. A major design aspect and requirement for IO-Link communications—being asynchronous—is the timing accuracy between the master device and the slave device.

According to the timing detection and correction method, the slave device detects the actual timing of the master device and corrects its initial timing to the actual timing of the slave device. In one embodiment, the slave device continuously tracks the actual timing of the master device and corrects its actual timing to the actual timing of the master device.

As shown in FIG. 1, the method is started, i.e., the slave device is ready for a communication and is listening to the communication channel. This is, for example, initiated by the master device by sending a wake-up request (WURQ) to the slave device.

After the slave device is ready for communication and listening to the communication channel, the master device sends an INIT request to the slave device via the communication channel to set up the communication between the master device and the slave device. The slave device detects the INIT request sent from the master.

From the received INIT request, the slave device calculates the actual timing of the master device. Before sending a response to the master device, the slave device corrects its initial timing to the calculated actual timing of the master device, thereby increasing the timing accuracy between the master device and the slave device.

After the communication between the master device and the slave device has been set up, the slave device continuously tracks the actual timing of the master device and corrects its actual timing. This is achieved by receiving data transmissions from the master device at the slave device and calculating the actual timing of the master device from the received data transmission at the slave device. This can be for example performed after each received data transmission or after a predefined number of data transmissions.

The step of calculating the actual timing of the master device from the received INIT request and/or the received data transmission comprises the step of extracting timing information from the received INIT request and/or the received data transmission. The extracting of the timing information from the received INIT request and/or from the received data transmission for example comprises the step of detecting rising and/or falling edges in the INIT request and/or the received data transmission. The difference between detected rising and/or falling edges in the INIT request and/or the received data transmission is used to calculate the actual timing of the master device.

The step of calculating the actual timing of the master device from the received INIT request and/or calculating the actual timing of the master device from at least one received data transmission comprises the step of counting clock pulses in the INIT request or at least one data transmission. For example, clock pulses between predefined rising and/or falling edges in the INIT request or at least one data transmission are counted.

The step of extracting timing information from the received INIT request and/or the received data transmission is performed by a hardware component of the slave device.

For example, a hardware comparator detects rising and/or falling edges in the INIT request and/or the received data transmission.

The step of calculating the actual timing of the master device from the received INIT request and/or the received data transmission is performed by a software component of the slave device, wherein the software component processes the timing information extracted from the received INIT request and/or the received data transmission.

According to a variant, the initial timing and/or actual timing of the slave device is only corrected if a predetermined threshold is exceeded. Thus, if there is only a minor difference between the timing of the master device and the slave device, which has no negative impact on the communication, the timing of the slave device is not corrected.

The method is executed by the slave device until the communication with the master device ends.

The slave device of the IO-Link communication comprises multiple UART modules each implementing the steps of:
detecting an INIT request at the slave device sent from the master device during communication setup,
calculating actual timing of the master device from the INIT request received, and
correcting initial timing of the slave device to an actual timing of the slave device based on the actual timing of the master device.

Furthermore, the multiple UART modules each have different initial timing settings. Thereby, it is more likely that the INIT request sent by the master device during communication setup is correctly received by at least one UART module. The module correctly receiving the INIT request is chosen for further communication between the slave device and master device. If more than one module correctly receives the INIT request, the fastest module is chosen.

Figure 2:
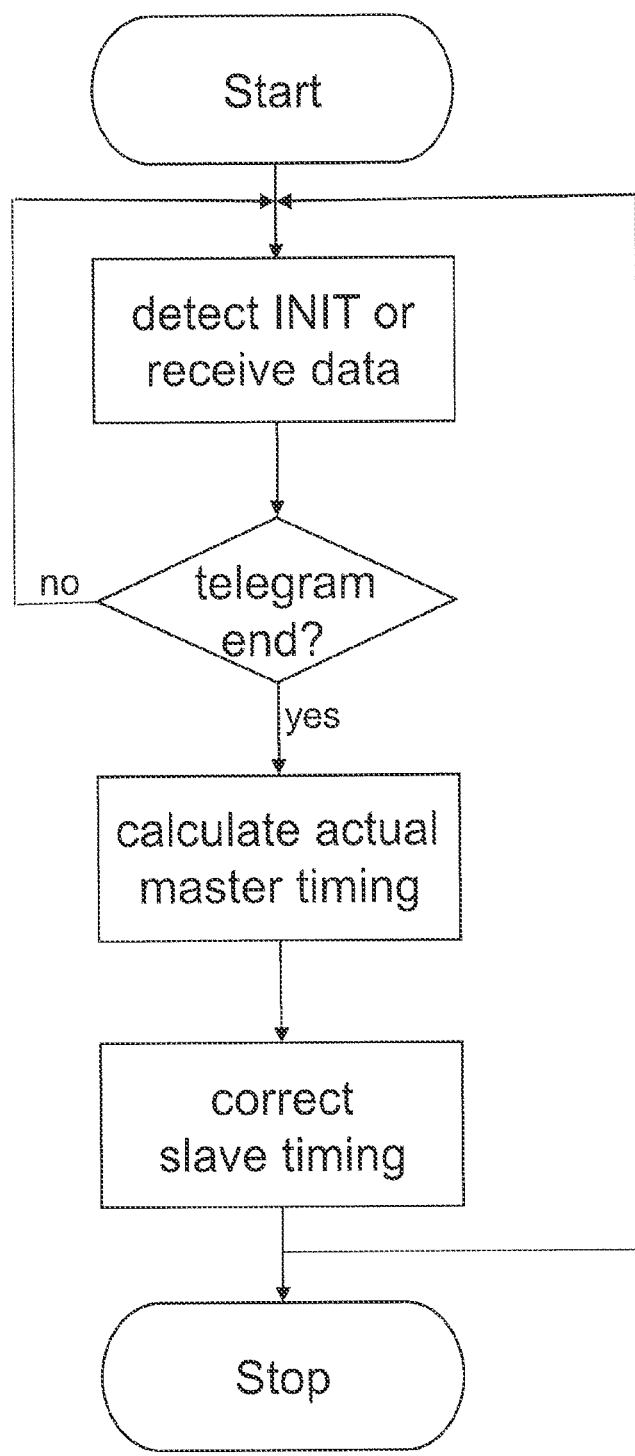

FIG. 2 shows a flow chart of a second embodiment of a timing and detection method for a slave device in an IO-Link communication.

The second embodiment shown in FIG. 2 differs from the first embodiment shown in FIG. 1 in that the actual timing of the slave device is corrected after the end of one or more complete master telegrams. A master telegrams comprises two or more data transmissions or the INIT request and at least one data transmission.

Once the slave device received one or more complete master telegrams, the slave device can calculate the actual timing of the master device from the received master telegram, i.e., the INIT request and the one or more data transmission respectively the two or more data transmissions.

In this variant the correction of the actual timing of the slave device can for example be based on low-pass filtering multiple data transmission of one or more master telegrams.

Figure 3:
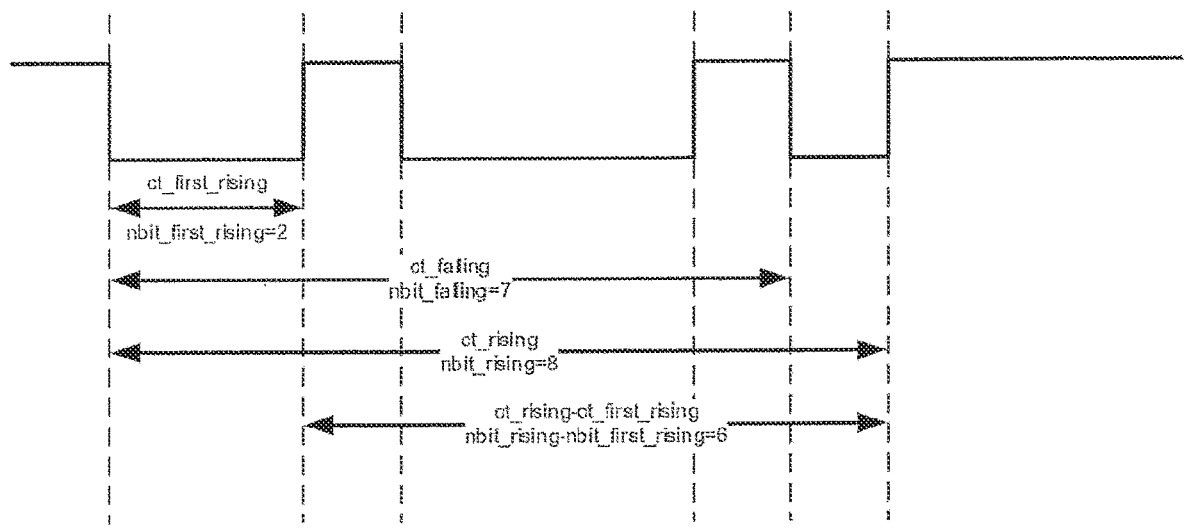

FIG. 3 shows a signal diagram of an INIT request of an IO-Link communication and the extracting of timing information from the received INIT request.

Once the slave device detects the falling edge of the start bit of the INIT request the following counters are started:
Telegram_Counter,
Bit_Time_Counter, and
Bit_num_Counter.

The Telegram-Counter counts clock pulses from the first falling edge in the protocol until the end of the protocol. The protocol is the INIT request or data transmission according to the first embodiment shown in FIG. 1 or the data telegram according to the second embodiment shown in FIG. 2. The clock pulses are generated by the timing reference of the slave device. The Bit_Time_Counter counts the number of nominal clock pulses per configured Bit_Time. The configured Bit_Time depends on the common basic timing, particularly an agreed baud-rate between the master device and the slave device. The Bit_Time_Counter rolls over when bit_time_clocks value is reached. The Bit_Time_Counter triggers a count pulse for Bit_Num_Counter at about 50% of Bit_Time to account for early/late arrival of next edge. The Bit_Num_Counter counts elapsed bit times from first falling edge in protocol based on ticks triggered by Bit_Time_Counter.

As soon as the first rising edge in the protocol is detected, the value of Telegram_Counter is stored in register ct_first_rising and the value of Bit_Num_Counter is stored in register nbit_first rising.

As soon as a falling edge is detected in the protocol after the first falling edge the value of Telegram_Counter is stored in register ct_falling and the value of Bit_Num_Counter is stored in register nbit_falling. This is repeated until the end of the protocol.

As soon as a rising edge is detected in the protocol after the first rising edge the value of Telegram_Counter is stored in register ct_rising and the value of Bit_Num_Counter is stored in register nbit_rising. This is repeated until the end of the protocol.

The acquired timing values are illustrated in FIG. 3.

The actual timing of the slave device is corrected to:

$$\text{bit\_time\_clock} = \frac{(\text{ct\_falling} + \text{ct\_rising} - \text{ct\_first\_rising})}{(\text{nbit\_falling} + \text{nbit\_rising} - \text{nbit\_first\_rising})}$$

$$\text{pulse asymmetry} = \frac{(\text{ct\_rising} - \text{ct\_falling})}{(\text{nbit\_rising} - \text{nbit\_falling})} - \text{bit\_time\_clock}$$

During the continuous tracking of the actual timing of the master device, the slave device for example checks if the timing is within certain limits defined by a threshold. The threshold is for example defined by register x_counts. The slave device continues to extract the above timing information from received data transmissions (protocols).

The actual timing of the slave device is for example corrected as follows:

```
If      (((bit_time_clock * nbit_rising) + pulse_asymmetry) < (ct_rising – x_counts))
then    increase bit_time_clock
else
if      (((bit_time_clock * nbit_rising) + pulse_asymmetry) > (ct_rising + x_counts))
then    decrease bit_time_clock
else    no change.
```

This is only one example of an algorithm for correcting the initial and/or actual timing of the slave device to the actual timing of the master device. Other approaches like low pass filtering can also be used.

What is claimed is:

1. A slave device for IO-Link communication with a master device, wherein the master device and the slave device operate on a common basic timing, the slave device comprising:
   at least one Universal Asynchronous Receiver Transmitter (UART) module configured to:
      detect an INIT request sent from the master device during communication setup, wherein the INIT request is a request to set up communication between the master device and the slave device;
      extract timing information from the INIT request;
      use the extracted timing information to determine an actual timing of the master device from the INIT request; and
      correct an initial timing of the slave device to an actual timing of the slave device based on the actual timing of the master device.

2. The slave device according to claim 1,
   wherein the common basic timing is defined as a baud-rate, and
   wherein the at least one UART modules is configured to correct the initial timing of the slave device based on a baud rate offset.

3. The slave device according to claim 1,
   wherein the at least one UART module is configured to:
      continuously track the actual timing of the master device; and
      correct the actual timing of the slave device.

4. The slave device according to claim 3,
   wherein the at least one UART module is configured to, in continuously tracking the actual timing of the master device, determine the actual timing of the master device from at least one received data transmission at the slave device.

5. The slave device according to claim 4,
   wherein the at least one UART module is configured to determine the actual timing of the master device from the at least one received data transmission at the slave device after each received data transmission.

6. The slave device according to claim 4,
   wherein the at least one UART module is configured to correct the actual timing of the slave device after the end of one or more complete master telegrams, and
   wherein one master telegram of the one or more complete master telegrams comprises two or more data transmissions.

7. The slave device according to claim 6,
   wherein the at least one UART module is configured to correct the actual timing of the slave device based on low-pass filtering multiple data transmission of the one or more complete master telegrams.

8. The slave device according to claim 4,
   wherein the at least one UART module is configured to determine the actual timing of the master device from the INIT request by extracting timing information from the at least one received data transmission.

9. The slave device according to claim 8,
   wherein the at least one UART module is configured to, in extracting the timing information from one or more of the INIT request and the at least one data transmission, detect one or more of rising and falling edges in the one or more of the INIT request and the received at least one data transmission.

10. The slave device according to claim 8,
    wherein the at least one UART module comprises a hardware component configured to extract the timing information from one or more of the INIT request and the at least one data transmission.

11. The slave device according to claim 8,
wherein the at least one UART module comprises a processor configured by software to process the timing information extracted from one or more of the INIT request and the at least one received data transmission to determine the actual timing of the master device.

12. The slave device according to claim 3,
wherein the at least one UART module is configured to only correct the initial timing and/or actual timing of the slave device if a predetermined threshold is exceeded.

13. The slave device according to claim 6,
wherein the at least one UART module is configured to count clock pulses in the INIT request, one or more of the at least one data transmission and the one or more master telegrams to determine the actual timing of the master device.

14. The slave device according to claim 4, comprising a plurality of the UART module each having different initial timing settings.

15. A timing detection and correction method for a slave device in an IO-Link communication including a master device and the slave device operating on a common basic timing, the timing detection and correction method comprising:

detecting an INIT request sent from the master device during communication setup, wherein the INIT request is a request to set up communication between the master device and the slave device;

extracting timing information from the INIT request;

using the extracted timing information to determine an actual timing of the master device from the INIT request; and correcting an initial timing of the slave device to an actual timing of the slave device based on the actual timing of the master device.

\* \* \* \* \*